United States Patent
Ramachandran et al.

(10) Patent No.: US 9,407,809 B2
(45) Date of Patent: Aug. 2, 2016

(54) STRATEGIES FOR TRIGGERING DEPTH SENSORS AND TRANSMITTING RGBD IMAGES IN A CLOUD-BASED OBJECT RECOGNITION SYSTEM

(71) Applicant: QUALCOMM Incorporated, San Diego, CA (US)

(72) Inventors: Mahesh Ramachandran, San Jose, CA (US); Bojan Vrcelj, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/461,000

(22) Filed: Aug. 15, 2014

(65) Prior Publication Data

US 2015/0146027 A1  May 28, 2015

Related U.S. Application Data

(60) Provisional application No. 61/909,963, filed on Nov. 27, 2013.

(51) Int. Cl.
| | |
|---|---|
| H04N 5/225 | (2006.01) |
| H04N 5/232 | (2006.01) |
| G06T 7/00 | (2006.01) |
| H04N 13/02 | (2006.01) |
| G06K 9/20 | (2006.01) |

(52) U.S. Cl.
CPC .......... *H04N 5/23206* (2013.01); *G06T 7/0051* (2013.01); *H04N 5/23219* (2013.01); *H04N 5/23241* (2013.01); *H04N 13/0253* (2013.01); *H04N 13/0271* (2013.01); *G06K 9/2054* (2013.01)

(58) Field of Classification Search
CPC .......... H04N 5/23206; H04N 5/23241; H04N 13/0253; H04N 13/0271; H04N 5/23219; G06T 7/0051; G06T 2207/30; G06T 2207/10028; G06K 9/2054
USPC .............................. 348/207.1, 207.11, 222.1
See application file for complete search history.

(56) References Cited

U.S. PATENT DOCUMENTS

| | | |
|---|---|---|
| 2005/0189419 A1 | 9/2005 | Igarashi et al. |
| 2012/0250980 A1 | 10/2012 | Gillard et al. |
| 2012/0327218 A1 | 12/2012 | Baker et al. |
| 2013/0016275 A1 | 1/2013 | Hokoi |
| 2013/0050425 A1 | 2/2013 | Im et al. |

(Continued)

OTHER PUBLICATIONS

Bo L. et al., "Depth Kernel Descriptors for Object Recognition", in IEEE/RSJ International Conference on Intelligent Robots and Systems (IROS), Sep. 2011, pp. 821-826.

(Continued)

*Primary Examiner* — Yogesh Aggarwal
(74) *Attorney, Agent, or Firm* — Silicon Valley Patent Group LLP

(57) ABSTRACT

Systems, apparatus and methods for triggering a depth sensor and/or limiting bandwidth and/or maintaining privacy are presented. By limiting use of a depth sensor to times when an optical image alone is insufficient, mobile device power is saved. Furthermore, by reducing a size of an optical image to only the portion of the image needed to detect an object, bandwidth is saved and privacy is maintained by not communicating unneeded or undesired information.

20 Claims, 13 Drawing Sheets

(56) References Cited

U.S. PATENT DOCUMENTS

| 2013/0050426 | A1 | 2/2013 | Sarmast et al. |
| 2013/0100119 | A1 | 4/2013 | Evertt et al. |
| 2013/0141597 | A1* | 6/2013 | Lee .................... H04N 5/23219 348/207.11 |
| 2013/0169626 | A1 | 7/2013 | Balan et al. |
| 2013/0182905 | A1 | 7/2013 | Myers et al. |

OTHER PUBLICATIONS

Bo L. et al., "Object Recognition with Hierarchical Kernel Descriptors", In proceeding of: The 24th IEEE Conference on Computer Vision and Pattern Recognition, CVPR 2011, Jun. 20-25, 2011, pp. 1729-1736.

Izadi S. et al., "KinectFusion: Real-time 3D Reconstruction and Interaction Using a Moving Depth Camera", UIST '11 Proceedings of the 24th annual ACM symposium on User interface software and technology, Oct. 2011, pp. 559-568.

Johnson E. A. et al., "Using Spin Images for Efficient Object Recognition in Cluttered 3D Scenes", IEEE Transactions on PAMI, vol. 21, No. 5, May 1999, p. 433-449.

International Search Report and Written Opinion—PCT/US2014/062970—ISA/EPO—Jan. 29, 2015.

Jain, H.P., et al., "Real-Time upper-body human pose estimation using a depth camera", Computer Vision/Computer Graphics Collaboration Techniques, Jan. 1, 2011, pp. 227-238, XP019167698, Springer Berlin Heidelberg, Berlin, Heidelberg. ISBN: 978-3-642-24135-2, p. 1-11.

* cited by examiner

STRATEGIES FOR TRIGGERING DEPTH SENSORS AND TRANSMITTING RGBD IMAGES IN A CLOUD-BASED OBJECT RECOGNITION SYSTEM

CROSS-REFERENCE TO RELATED APPLICATIONS

This application claims the benefit of and priority under 35 U.S.C. §119(e) to U.S. Provisional Application No. 61/909,963, filed Nov. 27, 2013, and entitled "Strategies for triggering depth sensors and transmitting RGBD images in a cloud-based object recognition system," which is incorporated herein by reference in its entirety.

BACKGROUND

I. Field of the Invention

This disclosure relates generally to depth sensor systems, apparatus and methods, and more particularly to determining when to use a depth sensor in a mobile device and/or minimizing a bandwidth of an image send from a mobile device.

II. Background

Mobile phones and other mobile devices may include several sensors, such as one or more image sensors, image sensing devices, inertial sensors, magnetic compasses and a GNSS sensor. An image sensing device, such as an optical camera, may include one or more front and/or rear facing cameras. The inertial sensors may include an accelerometer and/or a gyroscope. The GNNS sensor may include a GPS receiver. Future mobile devices may also include a Kinect depth sensor and/or a structured light sensor. Advances in power optimization and miniaturization make mobile devices with such sensors more likely.

A Kinect depth sensor includes an infrared projector and a monochrome receiver, such as a CMOS (complimentary metal-oxide semiconductor) sensor, that work together. The infrared projector transmits a known pattern. The monochrome receiver receives a reflected infrared image that may be used to determine where objects are located and how far they are placed.

A structured light sensor transmits a predefined light pattern onto an object. Simultaneously, one or more image sensors observe the light patterns reflexed from nearby objects. The pattern reflected back varies as the distance between the mobile device and an object changes. Therefore, the pattern reflected back may also be used to determine where objects are located and how far they are placed.

Such sensors, which allow a mobile device to snapshot depths at any instant, require significant power to transmit a signal. This signal is then reflected and received back at the mobile device, which requires additional power. Furthermore, a large amount of bandwidth is occupied transmitting an image for cloud-based object detection. Additionally, search times are significant when receiving and searching through an image for an object as compared to a partial image. Moreover, privacy information may be revealed in an image. For example, background of an image may reveal a location of a person taking the image. What is needed is a way to improve object-detection and recognition times while using less bandwidth, image processing power and/or increasing privacy.

BRIEF SUMMARY

Disclosed are systems, apparatus and methods for reducing power consumption, reducing bandwidth and/or increasing privacy.

According to some aspects, disclosed is a method in a mobile device for triggering a depth sensor, the method comprising: capturing an image with an image sensing device; sending at least some of the image to a server to search for an object within the image; receiving an indication indicating the object was not found in the image with sufficient certainty; enabling the depth sensor and capturing depth information; converting the depth information into a depth map; and sending at least some of the depth map to the server.

According to some aspects, disclosed is a mobile device for triggering a depth sensor, the mobile device comprising: an image sensing device to capture an image; a transmitter to send at least some of the image to a server to search for an object within the image; a receiver to receive an indication indicating the object was not found with sufficient certainty; the depth sensor to capture depth information; and a processor coupled to the image sensing device, the transmitter, the receiver and the depth sensor, wherein the processor is configured to: enable the depth sensor; convert the depth information into a depth map; and send at least some of the depth map to the server.

According to some aspects, disclosed is a mobile device for triggering a depth sensor, the mobile device comprising: means for capturing an image with an image sensing device; means for sending at least some of the image to a server to search for an object within the image; means for receiving an indication indicating the object was not found in the image with sufficient certainty; means for enabling the depth sensor and capturing depth information; means for converting the depth information into a depth map; and means for sending at least some of the depth map to the server.

According to some aspects, disclosed is a non-transient computer-readable storage medium, for a mobile device for triggering a depth sensor, including program code stored thereon, comprising program code for: capturing an image with an image sensing device; sending at least some of the image to a server to search for an object within the image; receiving an indication indicating the object was not found in the image with sufficient certainty; enabling the depth sensor, capturing depth information; converting the depth information into a depth map; and sending at least some of the depth map to the server.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
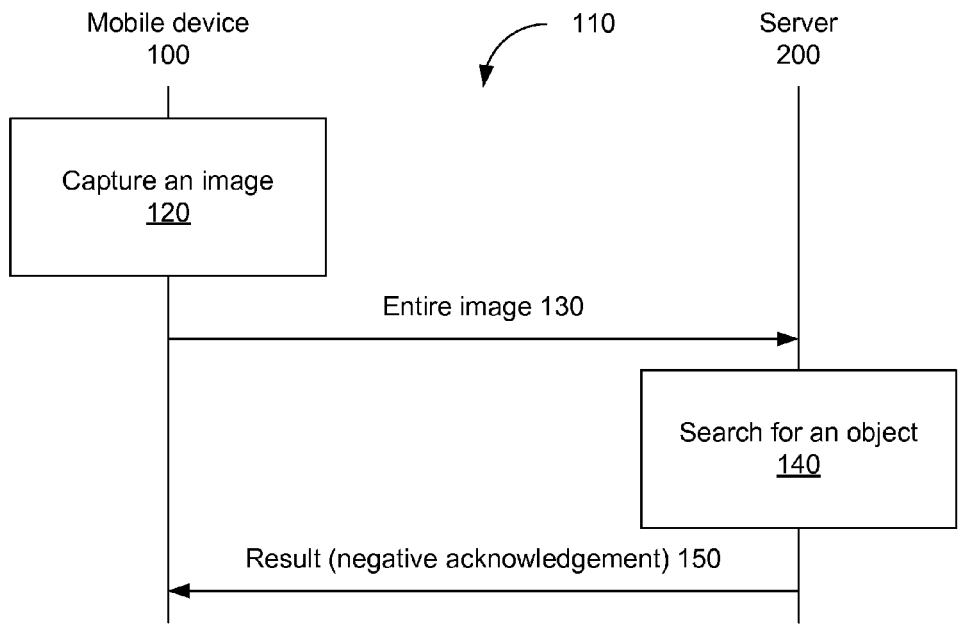
FIG. 1 illustrates a method to communicate an image between a mobile device and remote server to search for an object.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, tablets, head-mounted displays, wearable computing devices, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

A colored image (a red-green-blue image or an RGB image) from an image sensing device (such as an optical camera) and a depth map (D) (processed from a depth sensing device) may be presented simultaneously to form an RGB-D or RGBD image. Depth information from a depth sensing device or a depth sensor is processed into the depth map (D). An image also includes an optical image, a two-dimensional (2-D) image, an RGB image and the like. An object may more easily and quickly be found in an RGB image based on a corresponding depth map (D), for example, in an augmented reality (AR) application. As previously mentioned, a depth sensor uses a significant amount of power to transmit a signal that is reflected back to form the depth map (D). Therefore, what is disclosed are systems, apparatus and methods to limit use of a depth sensor on the mobile device to times when an optical image is insufficient. Furthermore, what is disclosed are systems, apparatus and methods to reduce a bandwidth of an optical image to only the portion of the image needed to detect an object by a mobile device or a remote server in the cloud.

FIG. 1 illustrates a method 110 to communicate an image between a mobile device 100 and remote server 200 to search for an object. The remote server 200 may be a cloud-based object recognition system. Some methods may communicate an entire image without using depth sensor information to the server 200 to find a particular object. In 120, in this case, mobile device 100 captures an optical image. Furthermore, a camera or other image sensing device in the mobile device 100 acts as a means for capturing an image. In 130, the mobile device 100 sends and a remote server 200 receives the image. A transceiver or transmitter in the mobile device 100 acts as a means for sending the image to a server 200 to search for an object. A transceiver or receiver in the server 200 acts as a means for receiving an image from a mobile device 100. In 140, the server 200 searches for an object within the image. A processor in the server 200 acts as a means for searching for an object within the image. At 150, the server 200 sends and the mobile device 100 receives results, in this example, containing a negative acknowledgement, which indicates the object was not detected in the image. A transceiver or transmitter in the server 200 acts as a means for sending the negative acknowledgement indicating the object was not found in the image. A transceiver or receiver in the mobile device 100 acts as a means for receiving the negative acknowledgement (indicating the object was not found in the image) or partial acknowledgement (indicating the object was found in the image but with high uncertainty or low confidence beyond a threshold). In some embodiments, a depth sensor may be used to detect the object with higher certainty.

Figure 2:
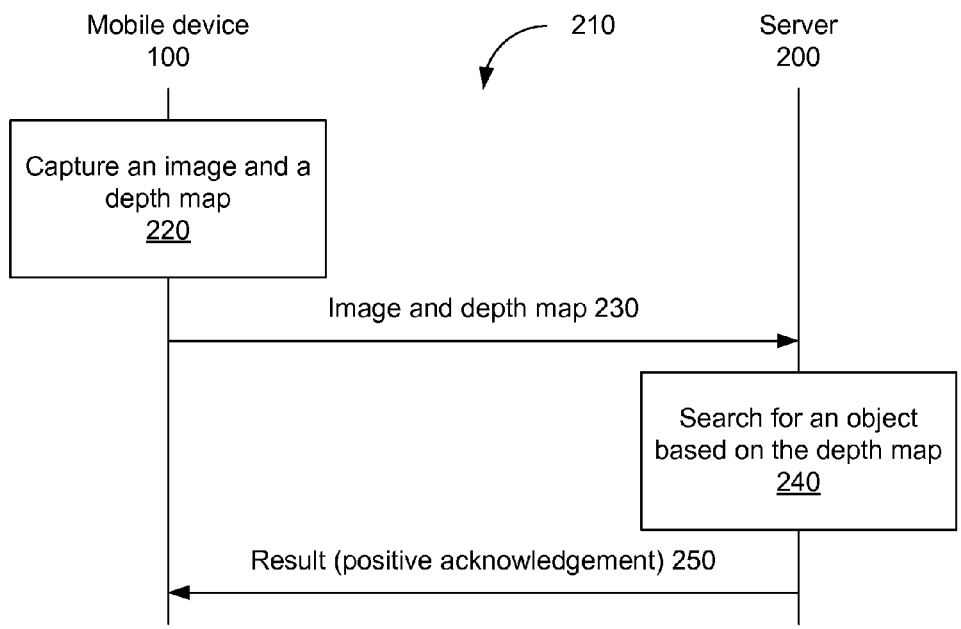
FIG. 2 illustrates a method to communicate an image with a corresponding depth map between a mobile device and remote server.

FIG. 2 illustrates a method 210 to communicate an image with a corresponding depth map between a mobile device 100 and remote server 200. The image may be an optical image, a visible image, an ultraviolet image, an infrared image and/or the like. At 220, the mobile device 100 captures an image with an image sensor and a depth map (D) with a depth sensor, both including the same object. At 230, the mobile device 100 communicates both the image and a depth map (D) to the server 200. At 240, the server 200 searches for an object using the image and/or the depth map (D). For example, the search may occur in the image based on a preliminary search in the depth map (D). The search may occur in the depth map (D) based on a preliminary search in the image. The search may occur as a correlation of the object with the image and/or the depth map (D). At 250, the server 200 communicates the search results, which in this case is a positive acknowledgement indicating the server 200 found the object in the image based on the depth map (D). Excessive power may be used if using a depth sensor to capture a depth map (D) with each image. Also, excessive bandwidth may be used if communicating a whole image and a depth map.

FIGS. 3-6 show methods to send a depth map or a partial depth map only when an object cannot be detected or is detected with low confidence in the image, in accordance with some embodiments of the present invention.

Figure 3:
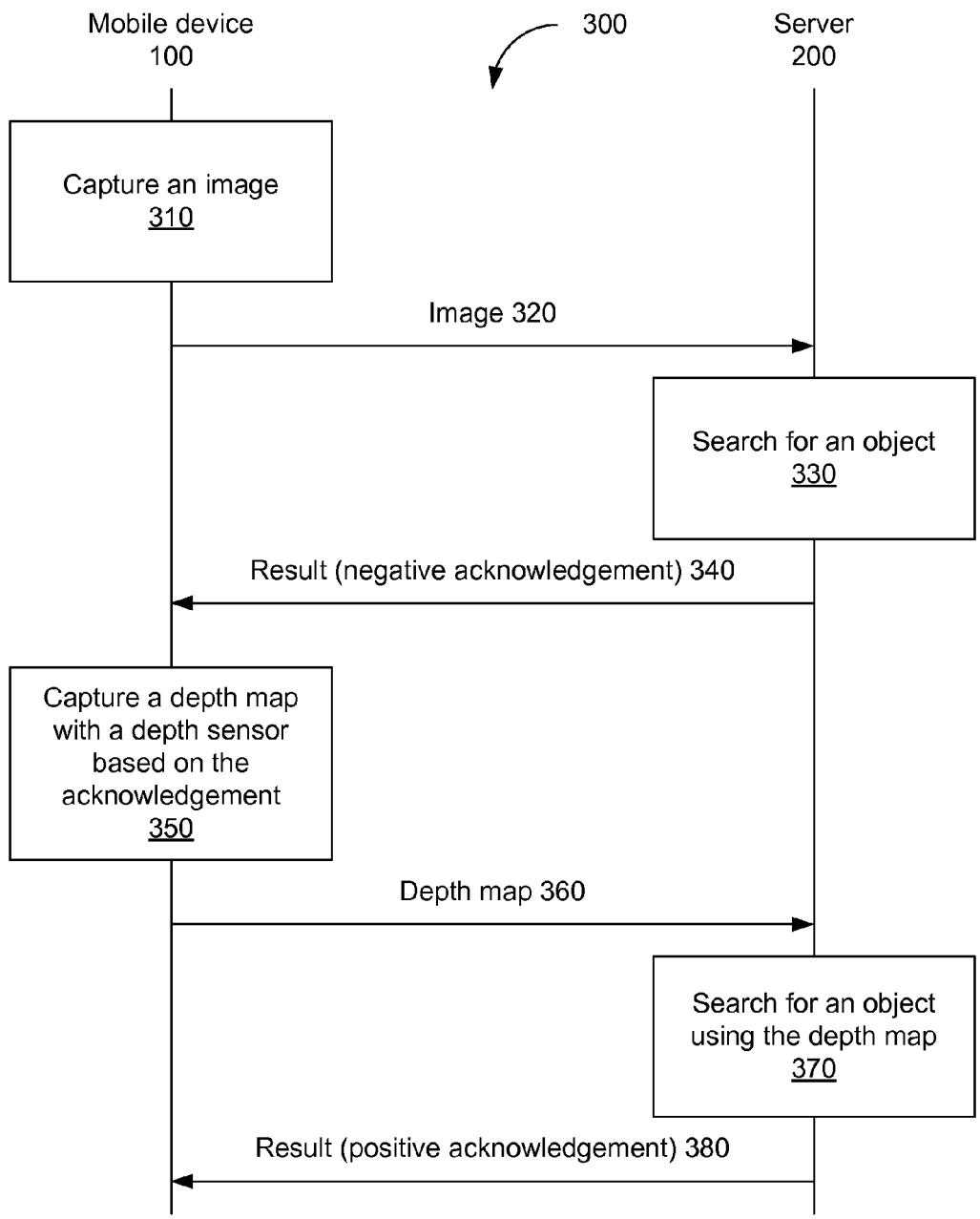
FIGS. 3-6 show methods to send a depth map or a partial depth map only when an object cannot be detected or is detected with low confidence in the optical image, in accordance with some embodiments of the present invention.

In FIG. 3, a method 300 sends a depth map (D) only when an object cannot otherwise be detected by searching the image or is detected with low confidence. At 310, a mobile device 100 captures an image. At 320, the image is communicated from the mobile device 100 to a server 200. Alternatively, the mobile device 100 may perform the functions of the server 200 described below. In these cases, the mobile device 100 performs operations described as performed in a server 200 and does not send and receive messages between the mobile device 100 and a server 200.

At 330, the server 200 searches for an object but is unable to find the object in this example. The object may be predetermined, such as the face of a particular person or the object may be more generic, such as any face. At 340, the result of the search is communicated from the server 200 to the mobile device 100. In this example, the server 200 sends a negative acknowledgement (indicating that the particular object was not found in the image) back to the mobile device 100. The server 200 may equivalently send a positive acknowledgement with a low confidence value (indicating that the particular object was found in the image but without enough confidence or too much uncertainty). If the server 200 finds the object with high enough certainty, the server 200 may send a positive acknowledgment and the mobile device 100 may skip triggering a depth sensor.

At 350, the mobile device 100 triggers a depth sensor based on the negative acknowledgement. That is, the mobile device 100 enables the depth sensor and captures a depth map (D) with the depth sensor including the same object as captured by the camera. The mobile device 100 may always or optionally capture a new image to more closely correspond to the depth map (D). After capturing the depth map (D), the mobile device 100 disables the depth sensor. The sequence of enabling, capturing and disabling is based on receiving a negative acknowledgement or an acknowledgement with low uncertainty. A receiver or transceiver receiving the acknowledgement acts as a means for triggering the depth sensor to capture a depth map (D). By triggering a depth sensor, the mobile device 100 enables and engages the depth sensor only during the duration the depth sensor is used to capture a depth map (D). Once the depth sensor has captured the depth map (D), the depth sensor is disabled to save battery power.

At 360, the depth map (D) is communicated from the mobile device 100 to the server 200. In embodiments that the mobile device 100 captures a new image that more closely correspond to the depth map (D), the mobile device 100 may also send the new image. The transceiver or transmitter in the mobile device 100 acts as a means for sending the depth map (D) to the server 200. The transceiver or receiver in the server 200 acts as a means for receiving the depth map (D) at the server 200. At 370, the server 200 searches for the object within the original image (received at 320) or the new image (received at 360) but this time using the depth map from 360. At 380, the result is communicated from the server 200 to the mobile device 100. In this example, the result contains a positive acknowledgement indicating the search found the object within the image.

Figure 4:
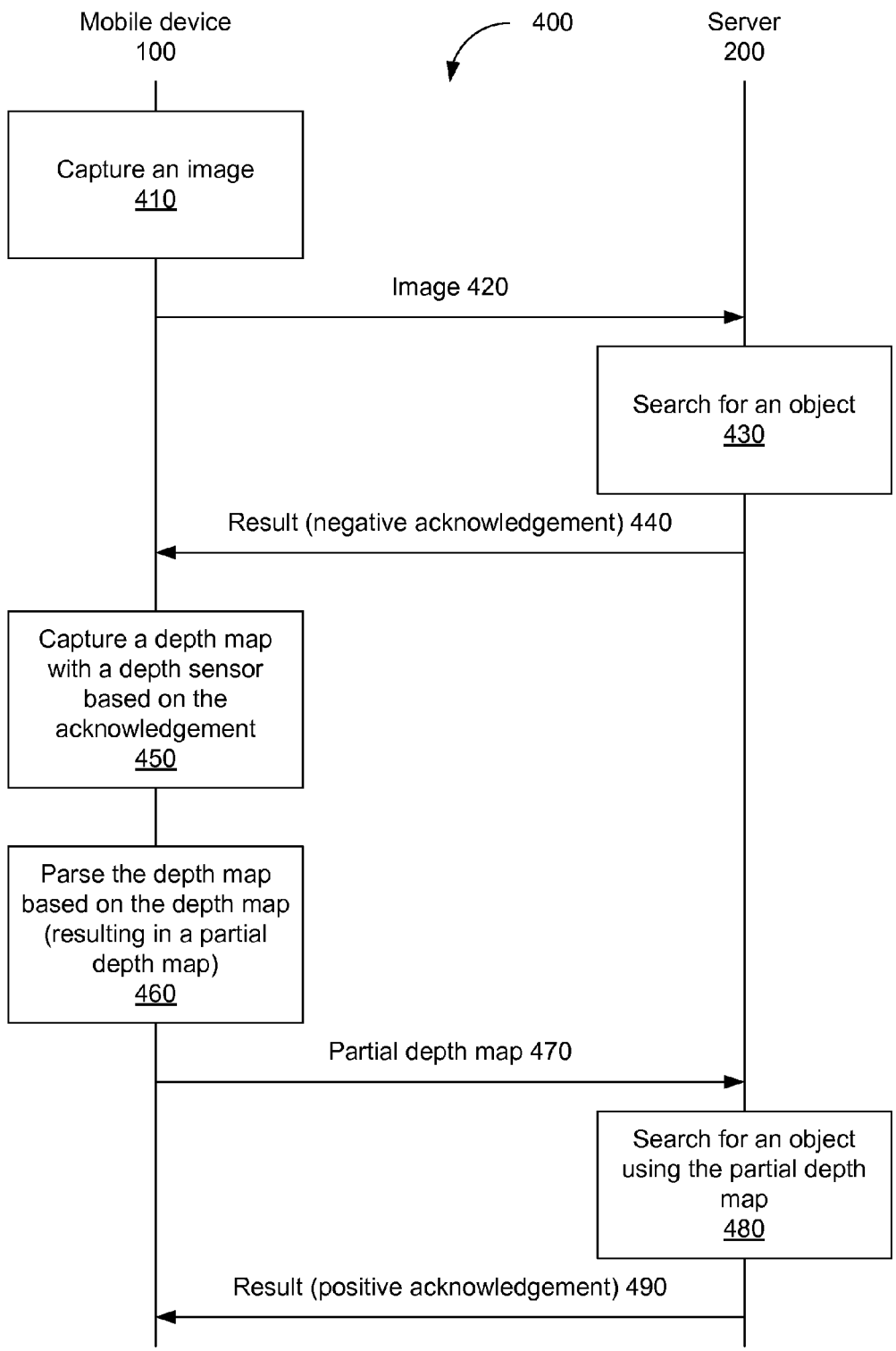

FIG. 4 shows a method 400 to use a partial depth map. At 410, a mobile device 100 captures an image. At 420, the image is communicated from the mobile device 100 to a server 200. At 430, the server 200 searches for an object, such as a known face or a generic face, within the image. At 440, the result is communicated from the server 200 to the mobile device 100 as a negative acknowledgement. In this example, the acknowledgement is either a negative acknowledgement, which indicates the search did not find the object, the acknowledgement may have been a positive acknowledgement indicating the search found the object but with insufficient certainty.

At 450, the mobile device 100 enables a depth sensor, captures a depth map (D) with the depth sensor and disables the depth sensor, based on the negative acknowledgement received at 440. At 460, the mobile device 100 parses the depth map (D) based on the depth map itself, which results in a partial depth map (D').

A processor in the mobile device 100 acts as a means for parsing the depth map (D) into a partial depth map (D') based on the depth map itself. For example, SLAM or the like may be used to parse the depth map (D). Alternatively, edges of the depth map (D) or edges in the original image may be used to parse the depth map (D). Alternatively, a partial depth map (D') includes only a fixed range of depths. For example, a partial depth map (D') may include depth measurements within a fixed range (e.g., within 1 meter from the depth sensor) and exclude depth measurements outside of the fixed range. Alternatively, the partial depth map (D') may include only an intermediary range (e.g., from 0.5 meters to 2 meters) of depth measurements and exclude depth measurements outside of this intermediary range. Alternatively, the partial depth map (D') may include depth measurements beyond a fixed distance (e.g., greater than 2 meters) and exclude depth measurements closer than this fixed distance.

In some embodiments, a particular object or private information (such as a human face, a human head, a human silhouette, text or a license plate) is detected by the mobile device 100 but masked out or otherwise excluded from a partial depth map (D'), the image (captured at 410) and/or a partial image. In this manner, privacy is maintained in a partial depth map by excluding location identifying information, such as information of a particular room or a certain building captured in the full depth map. Besides maintaining privacy, a lower bandwidth is required to send a partial depth map (D') as compared to a full depth map (D).

At 470, the partial depth map (D') is communicated from the mobile device 100 to the server 200. The transmitter or transceiver in the mobile device 100 acts as a means for sending the partial depth map (D') to a server 200 to search for an object. As discussed above, the object may be either specific (i.e., known a priori like a particular person's face) or generic (i.e., general like all faces or any license plate). The receiver or transceiver in the server 200 acts as a means for receiving the partial depth map (D') from the mobile device 100. In some embodiments, a new image may be captured at 450 that more closely matches the depth map (D) than the image captured at 410 because the new image is captured closer in time with the partial depth map (D') therefore may more closely correlate with the partial depth map (D'). In these embodiments, the new image or part of the new image may be sent with the partial depth map at 470.

Sending a partial depth map (D') may depend on one or more factors, such as a user configurable parameter, existence of identifying information of one's surroundings, or the like. At 480, the server 200 again searches for the object in the image (received from 420) or the new image or partial image (received from 470) but this time using the partial depth map (D'). The processor in the server 200 acts as a means for searching for the object again based on the partial depth map (D'). At 490, the result is communicated from the server 200 to the mobile device 100, in this case, in a positive acknowledgement indicating that the object was found.

Parsing an image and/or a depth map (D) may occur for certain ranges of thresholds. For example, the certain range may include (or exclude) depths less than a threshold distance ($0 < \text{distance} < Th_1$). Alternatively, the certain range may include (or exclude) all elements between a first threshold distance and a second threshold distance ($Th_1 < \text{distance} < Th_2$). Alternatively, the certain range may include (or exclude) all elements greater than a threshold distance ($Th_2 < \text{distance} < \infty$). The threshold(s) ($Th_1$ and/or $Th_2$) may be selected a priori or dynamically. For example, the thresholds may be dynamically set to include a certain percentage of distances while excluding other distances (e.g., excluding a closest 20% and a farthest 30% while including a middle 50%). An element or elements within the certain range may occupy a single portion of the image (e.g., the largest portion). Alternatively, elements within the certain range may occupy more than one disjointed portions of the image.

Figure 5:
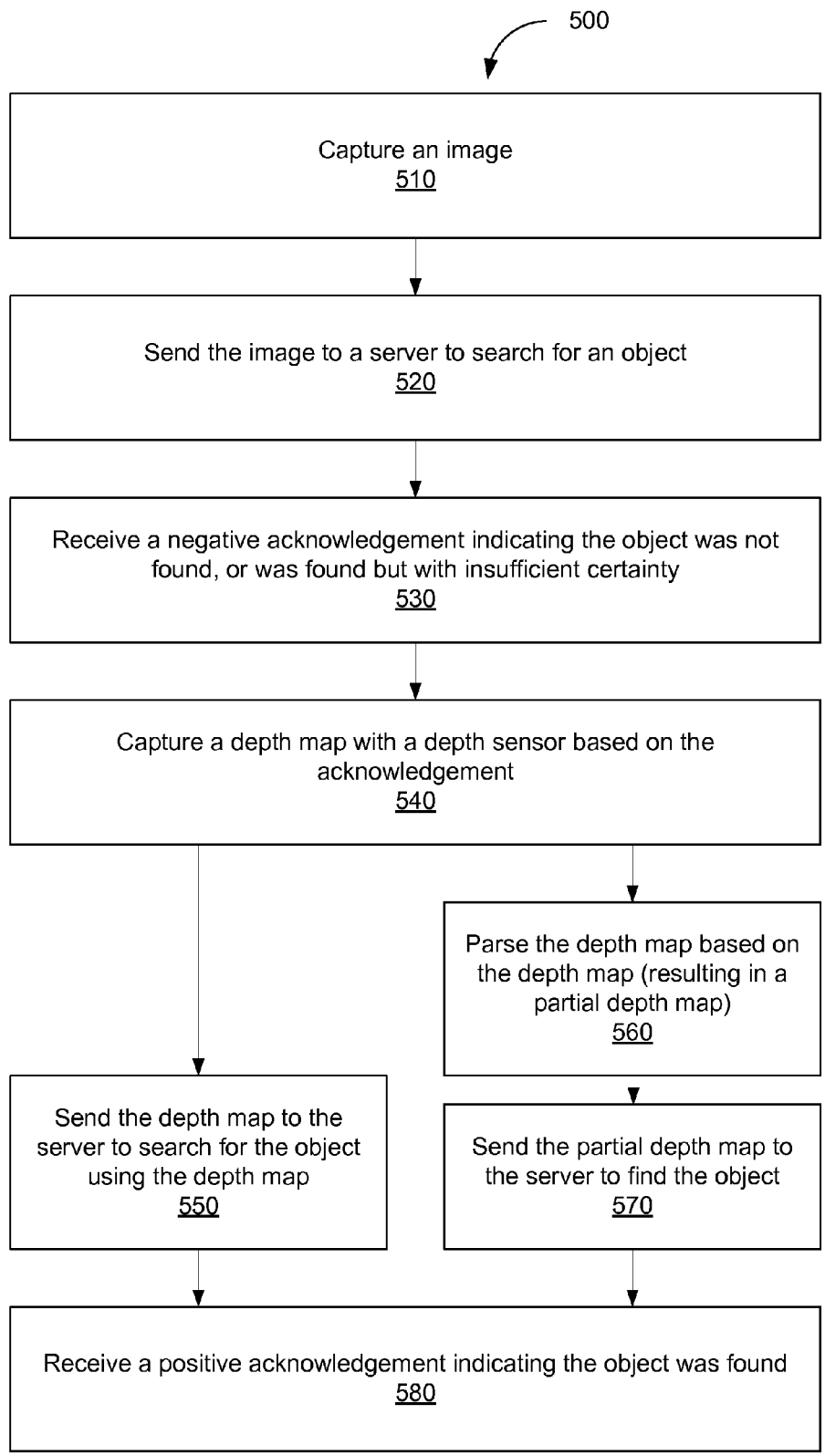

In FIG. 5, a mobile device 100 performs the methods 500 of FIGS. 3 and 4. At 510, the mobile device 100 captures an image with an image sensor. At 520, the mobile device 100 sends the image to a server 200 to search for an object. At 530, the mobile device 100 receives a negative acknowledgement. The acknowledgement is either negative acknowledgement indicating the object was not found or an acknowledgement indicating the object was found but with insufficient certainty or with low uncertainty. At 540, the mobile device 100 captures a depth map (D) with a depth sensor based on receiving the negative acknowledgement or indication of low uncertainty. At this point, embodiments either progress to 550 or alternatively to 560 and 570 then rejoin again at 580.

At 550, in embodiments the continue from 540 to 550, the mobile device 100 sends the depth map (D) to the server 200 to search for the object again but this time using the depth map (D). These embodiments then continue to 580. At 560, in other embodiments that continue from 540 to 560, the mobile device 100 parses the depth map (D), based on the depth map (D) itself, thereby resulting in a partial depth map (D'). At 570, the mobile device 100 sends the partial depth map (D') to the server 200 to find the object. At 570, the mobile device 100 sends the partial depth map (D'). In either case, a new image may be captured and sent with the depth map (D) or the partial depth map (D'). At 580, the mobile device 100 receives, in this example, a positive acknowledgement indicating the object was found.

Figure 6:
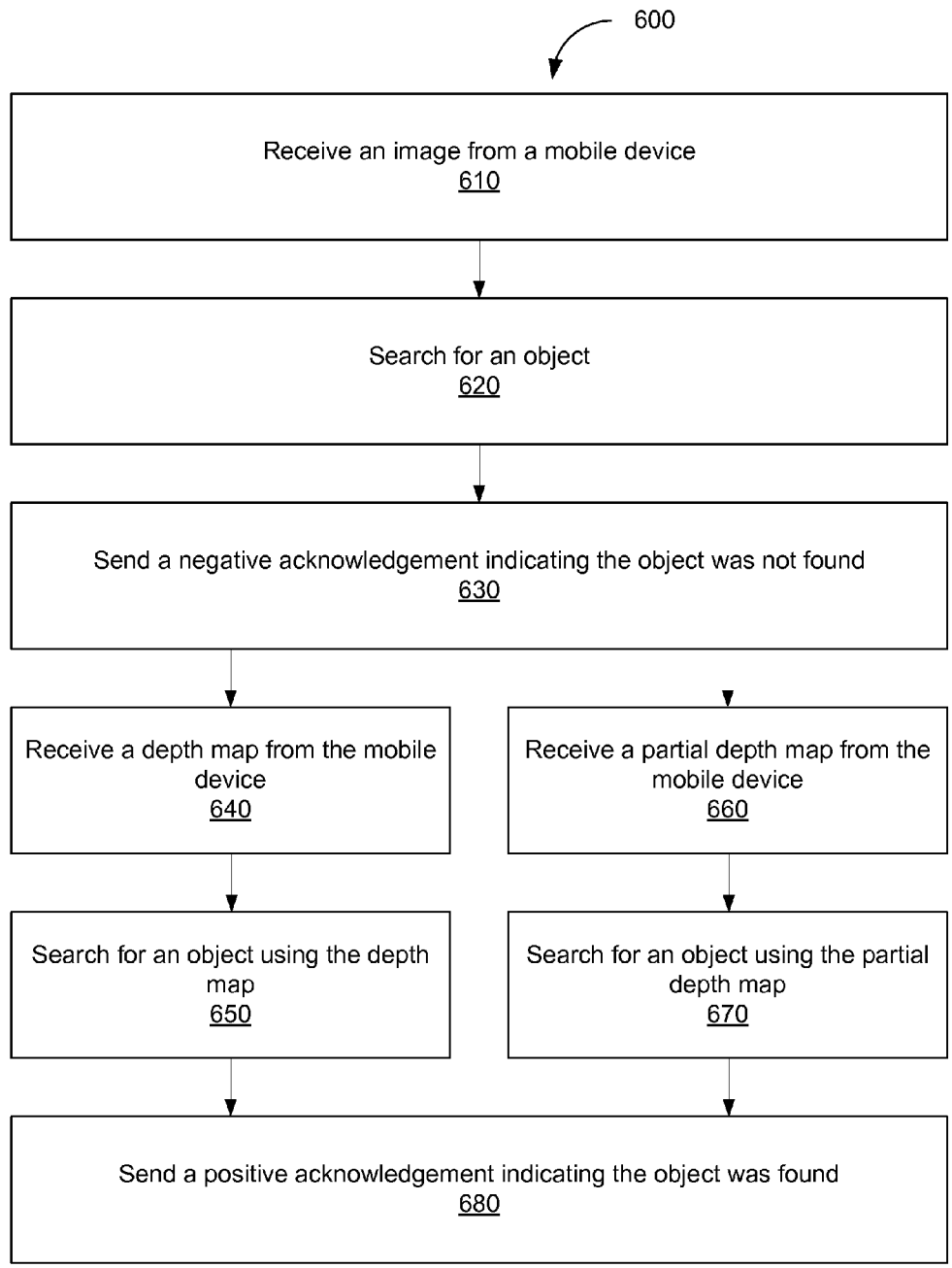

In FIG. 6, a server 200 performs the methods 600 of FIGS. 3 and 4. At 610, the server 200 receives an image from a mobile device 100. At 620, the server 200 searches for an object within the image. At 630, the server 200 sends a negative acknowledgement indicating the object was not found in the image or an acknowledgement indicating the object was found but with insufficient certainty. At this point embodiments either proceed to 640 and 650 or proceed to 660 and 670 before joining again at 680.

At 640, the server 200 receives a depth map (D) from the mobile device 100 sent in response to the acknowledgement. At this point, the server 200 may also receive a new image as indicated above. At 650, the server 200 searches for the object using the depth map. In some embodiments, at 660, the server 200 alternatively receives a partial depth map (D') from the mobile device 100. Again, the server 200 may also receive a new image, which may more closely correlate with the depth map (D) than the image received at 610. The partial depth map (D') is sent from the mobile device 100 based on the acknowledgement. At 670, the server 200 searches for the object using the partial depth map (D'). At 680, based on the results of either the search using the full or partial depth map, the server 200 sends a positive acknowledgement indicating, in this example, the object was found in the image.

Figure 7:
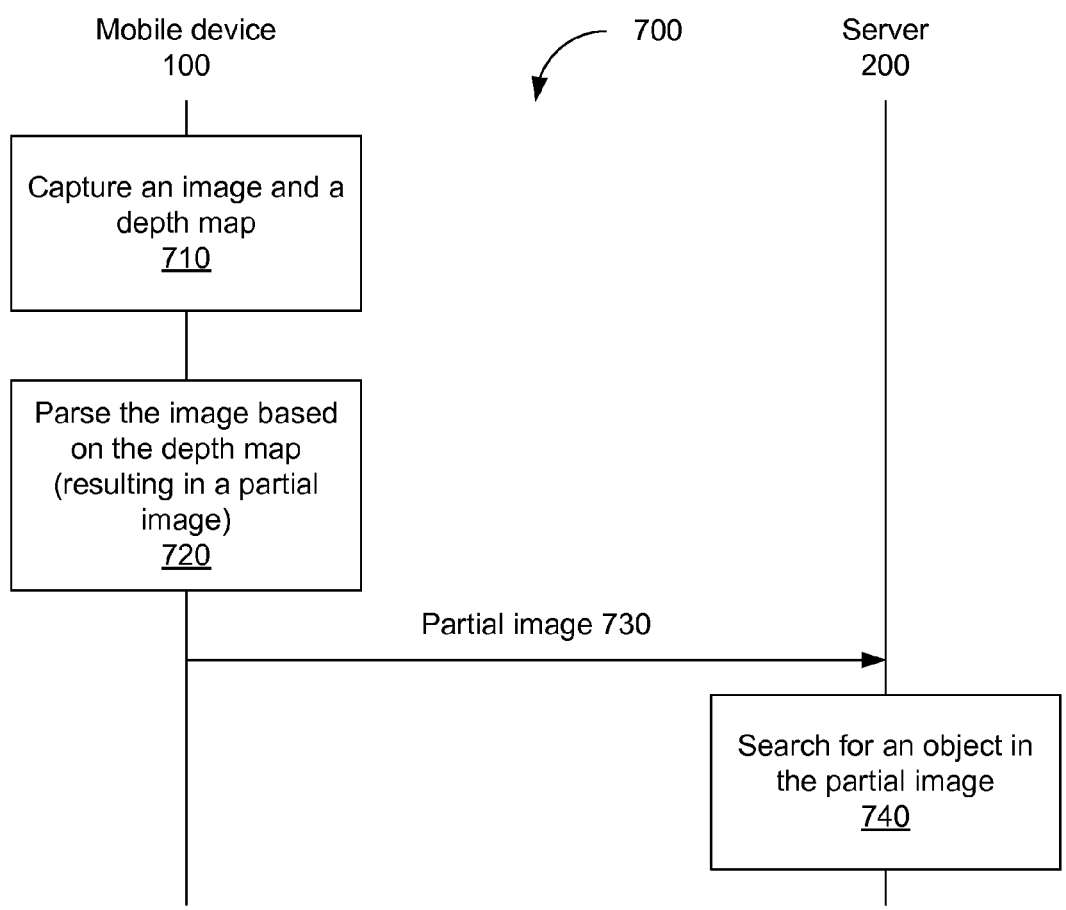
FIGS. 7-10 show methods to limit an image and/or a depth map based on the depth map, in accordance with some embodiments of the present invention.
Figure 8:
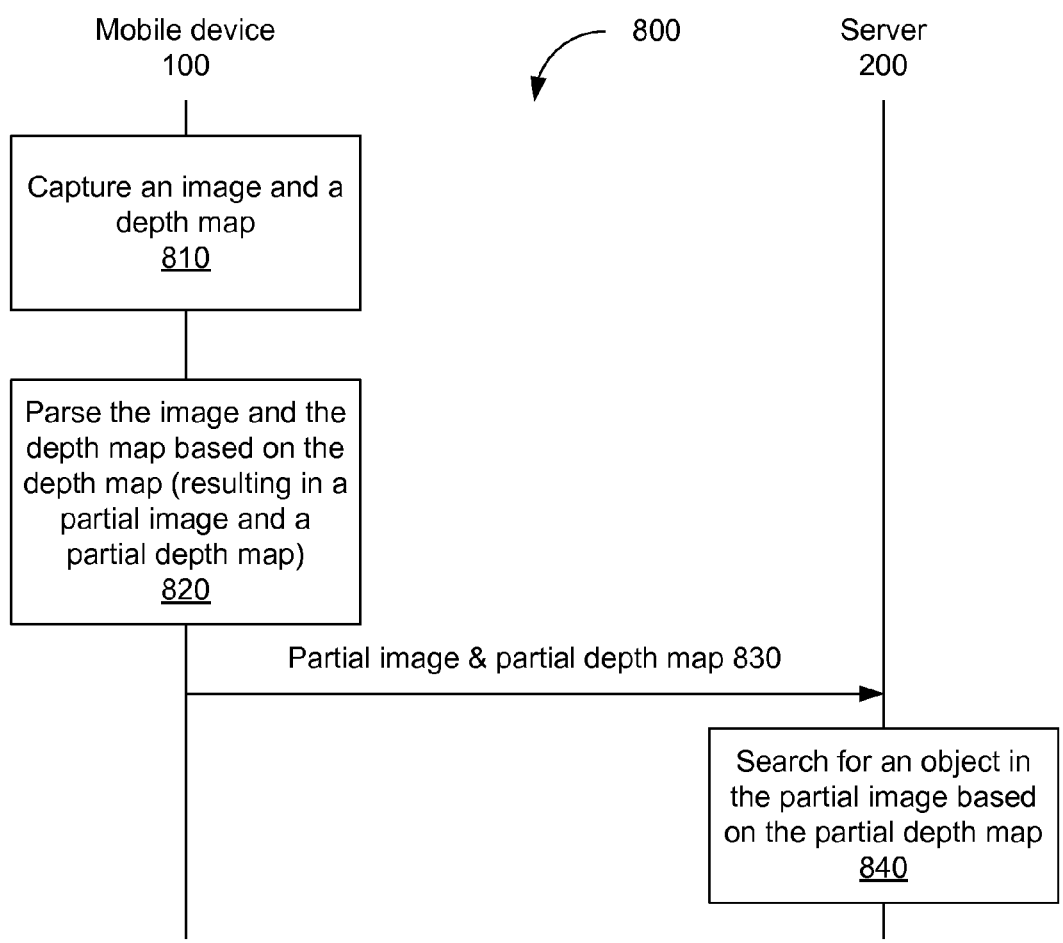

FIGS. 7-10 show methods to limit an image and/or a depth map (D) based on the depth map (D), in accordance with some embodiments of the present invention. In FIG. 7, a method 700 is shown. At 710, a mobile device 100 captures an image with an image sensor and a depth map (D) with a depth sensor. The image may be a color image (an RGB image) and the depth map (D) may be a monochrome image. At 720, the mobile device 100 parses the image based on the depth map (D) resulting in a partial image. At 730, the mobile device 100 communicates only the partial image to a server 200. Alternatively, the mobile device 100 may communicate only the partial image and the partial depth map (D') to a server 200 as shown in FIG. 8. At 740, the server 200 searches for an object within the partial image.

By communicating only a partial image at 730 rather than the whole image, bandwidth resources, transmission time and transmission power are saved. Furthermore, a partial image may better maintain privacy, as indicated above. Furthermore, by only searching a partial image at 740 rather than the whole image, time may be saved to perform the search on a smaller image. If a partial image was communicated because of privacy concerns, the server 200 may be unable to determine a location or surroundings of a user or may not receive other identifying markers.

In some embodiments, a method in a mobile device for triggering a depth sensor is disclosed. The method comprises: capturing an image with an image sensing device; enabling the depth sensor, capturing depth information and disabling the depth sensor; converting the depth information to a depth map; parsing the image based on the depth map resulting in a partial image; and sending the partial image to a server to search for an object within the partial image. Embodiments may also send the depth map or the partial depth map. In such a manner, privacy may be maintained by excluding private information such as a human face, a human head, a human silhouette, text, a license plate and/or the like.

In FIG. 8, both a partial image and a corresponding partial depth map (D') are communicated in method 800. At 810, a mobile device 100 captures an image with an image sensor and a depth map (D) with a depth sensor. At 820, the mobile device 100 parses the image and the depth map (D) based on the depth map (D) resulting in a partial image and a partial depth map (D'). At 830, the mobile device 100 communicates the partial image and the partial depth map (D') to a server 200. At 840, the server 200 searches for an object in the partial image based on the partial depth map (D'). By providing the server 200 with both the partial image and the partial depth map (D'), the server 200 may perform a more rigorous or exhaustive test than can the mobile device 100. Also, by providing a partial image and partial depth map (D'), privacy may be maintained.

Figure 9:
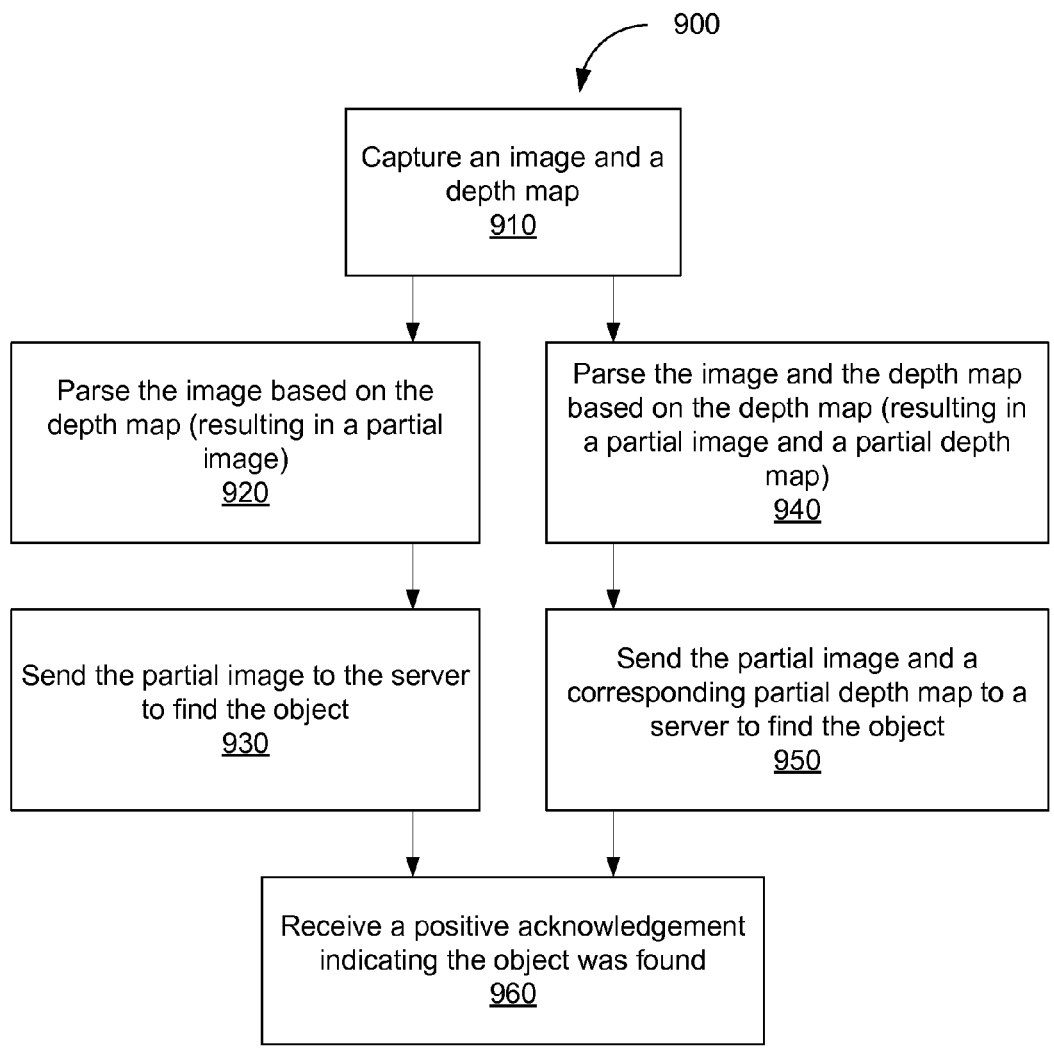

In FIG. 9, a mobile device 100 performs the methods 900 of FIGS. 7 and 8. At 910, the mobile device 100 captures both an image with an image sensor and a depth map (D) with a depth sensor. In some embodiments, processing continues at 920 and 930, while in other embodiments, processing continues at 940 and 950. In either case, embodiments rejoin again at 960.

At 920, the server 200 parses the image based on the depth map (D) thereby resulting in a partial image. At 930, the server 200 sends the partial image to a server 200 in order for the server 200 to search for an object. In other embodiments, at 940, the mobile device 100 parses the image and the depth map (D) based on the depth map (D) thereby resulting in a partial image and a corresponding partial depth map (D'). At 950, the mobile device 100 sends the partial image and the partial depth map (D') to a server 200. The embodiments rejoin at 960 to receive a positive acknowledgement at the mobile device 100 sent by the server 200 that the object was found.

Figure 10:
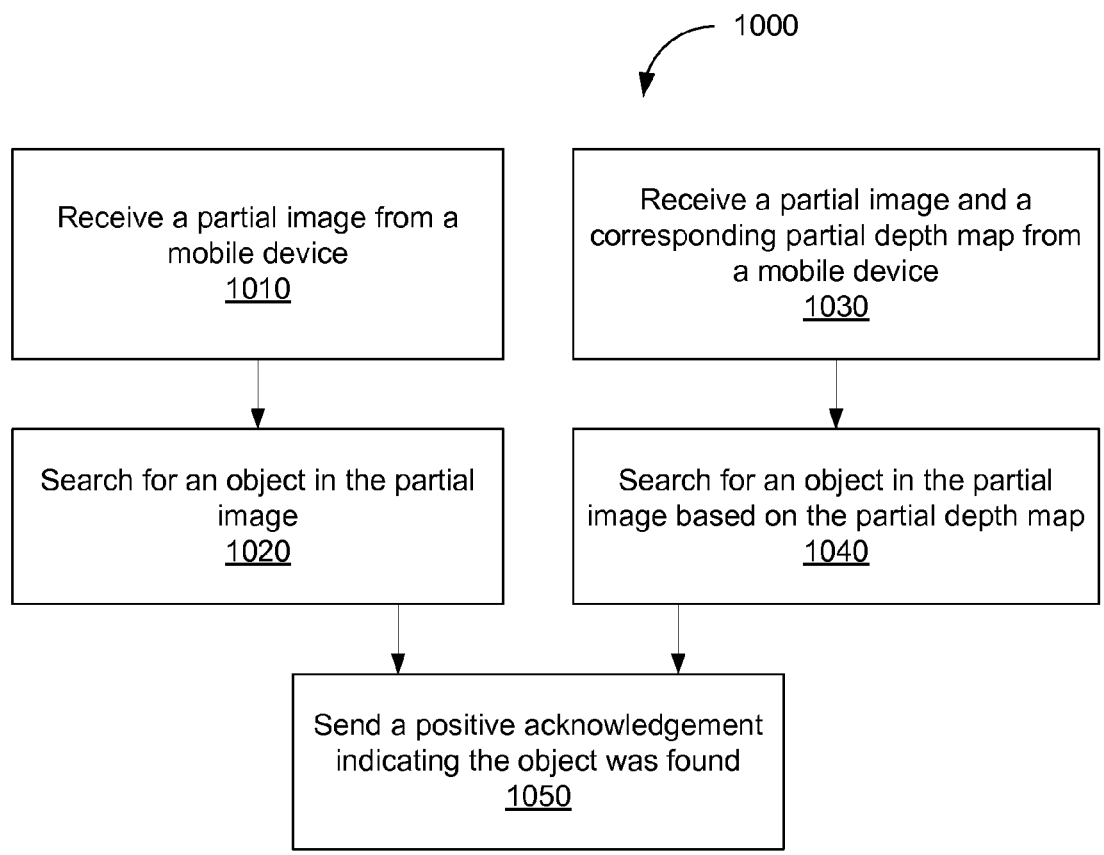

In FIG. 10, a server 200 performs the methods 1000 of FIGS. 7 and 8. Some embodiments perform 1010 and 1020 while other embodiments perform 1030 and 1040 before joining at 1050. At 1010, the server 200 receives a partial image from a mobile device 100. At 1020, the server 200 searches for an object in the partial image. In other embodiments at 1030, the server 200 receives both a partial image and a partial depth map (D') from a mobile device 100. At 1040, the server 200 searches for an object in the partial image based on the partial depth map (D'). At 1050, the methods join by a server 200 sending a positive acknowledgement indicating, in the example, the object was found in the partial image.

Figure 11:
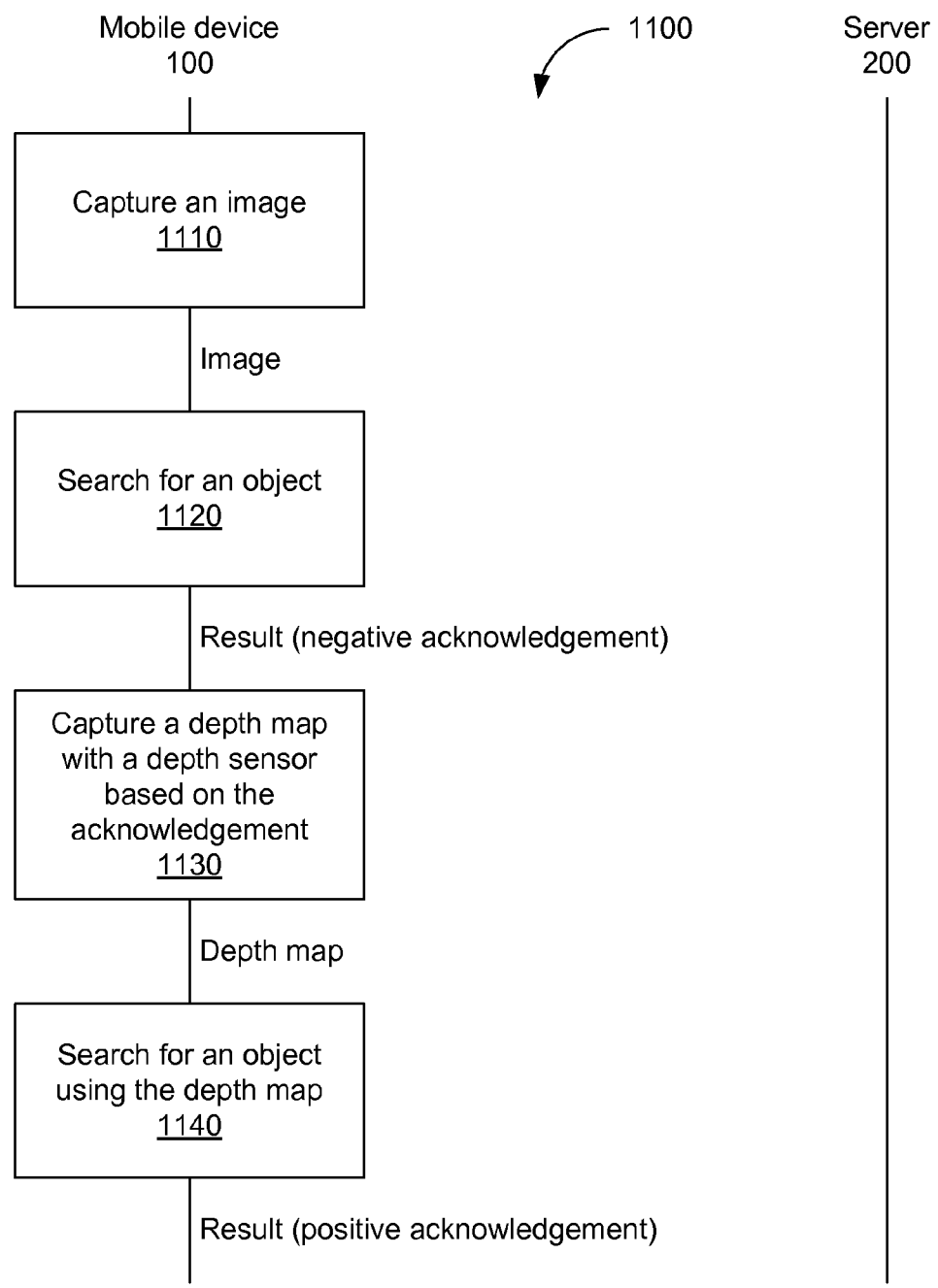
FIG. 11 illustrates a method in a mobile device without using a server, in accordance with some embodiments of the present invention.

FIG. 11 illustrates a method 1100 in a mobile device 100 without using a server 200, in accordance with some embodiments of the present invention. If a mobile device 100 performs functions of a server 200 as described above, the mobile device 100 performs triggers itself to enable a depth sensor, bandwidth is limited and privacy is inherently maintained by not transmitting either the image or the depth map (D).

At 1110, a mobile device 100 captures an image. The image is passed within the mobile device 100 from 1110 to 1120. At 1120, the mobile device 100 (rather than a server 200) searches for an object with the image. In this example, the mobile device 100 passes a negative acknowledgement indicating the mobile device 100 did not find the object. At 1130, the mobile device 100 enables the depth sensor, captures a depth map with the depth sensor, and disables the depth sensor.

Since the depth map (D) remains inside of the mobile device 100, the mobile device 100 does not need to parse the depth map (D) for bandwidth or privacy reasons. The depth map is passed from 1130 to 1140, within the mobile device 100. Again, an new image (similar to the original image from 1110) may be captured. At 1140, the mobile device 100 (rather than the server 200) again searches for the object but this time with the benefit of the depth map (D). A positive acknowledgement from step 1140 indicates that the object was found with sufficient certainty.

Figure 12:
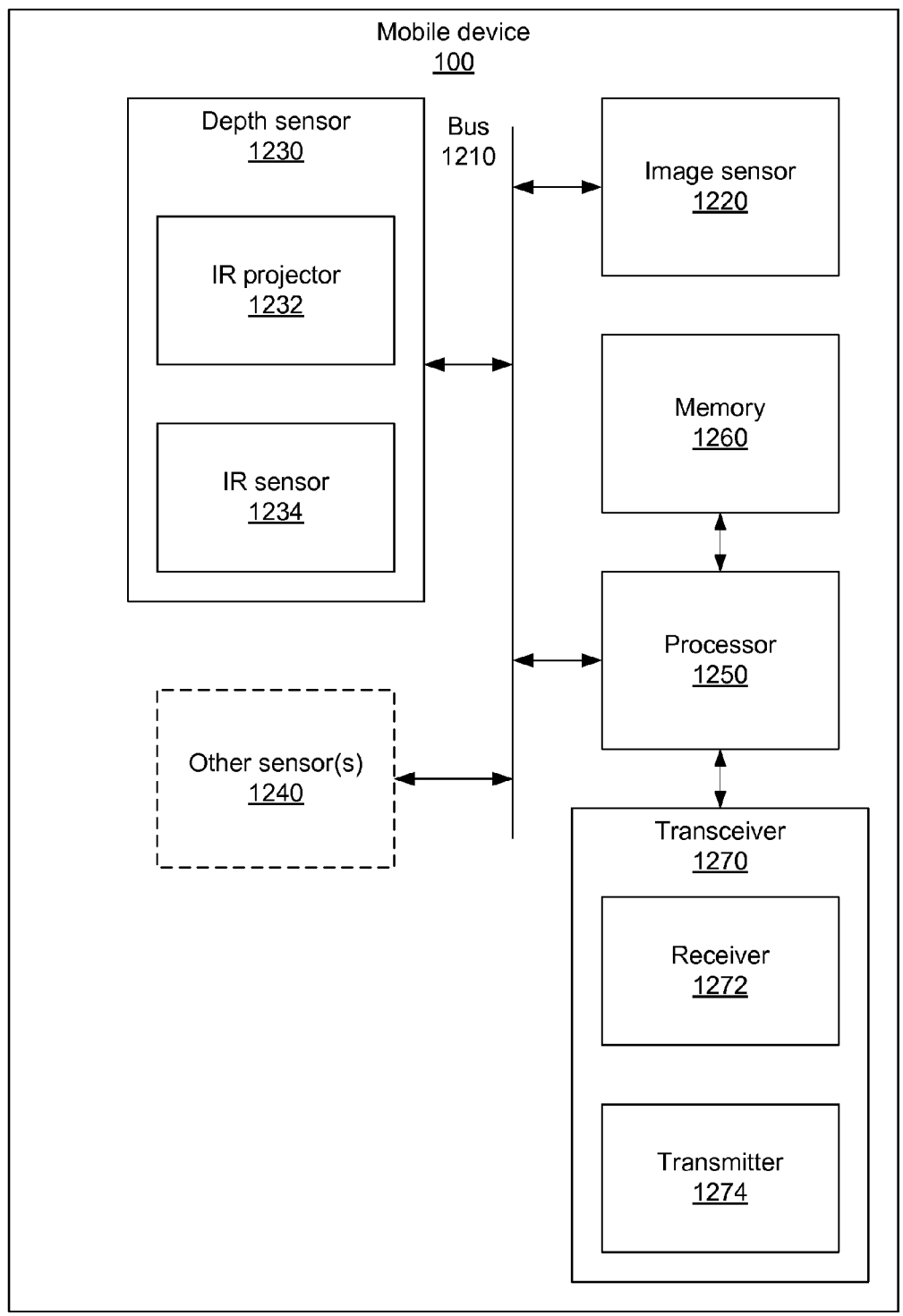
FIGS. 12-13 show a mobile device and a server, respectfully, in accordance with some embodiments of the present invention.
Figure 13:
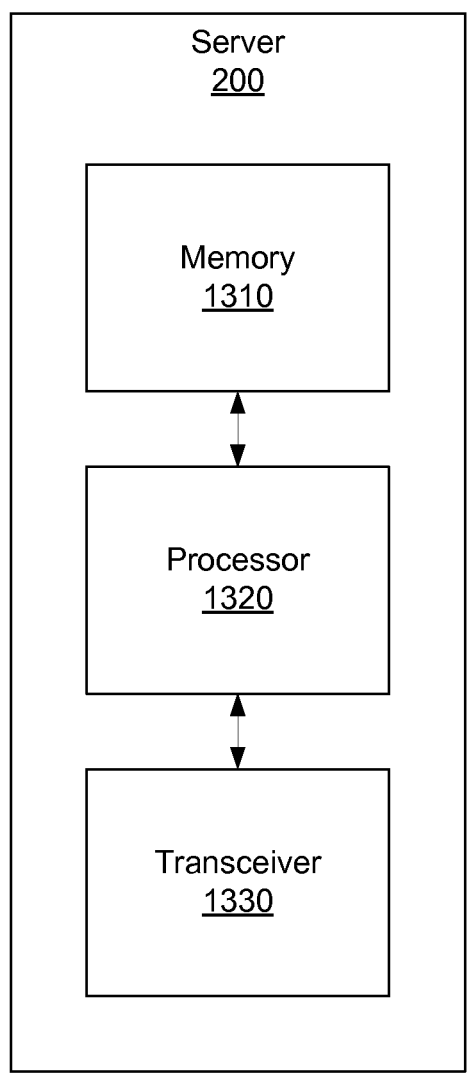

FIGS. 12-13 show a mobile device 100 and a server 200, respectfully, in accordance with some embodiments of the present invention. In FIG. 12, a mobile device 100 contains a bus 1210, an image sensor 1220, a depth sensor 1230, other optional sensor(s) 1240 (as indicated with the dotted lines) and a processor 1250. The bus 1210 couples together the image sensor 1220, the depth sensor 1230 and the optional sensors 1240 to the processor 1250. The image sensor 1220 or image sensing device captures an image. The image sensor 1220 sometimes recaptures a newer image.

The depth sensor 1230 includes an infrared (IR) projector 1232 and an IR sensor 1234. The depth sensor 1230 captures depth information. Similarly, the depth sensor 1230 may include a transmitter to transmit a unique or lined patterned and a corresponding receiver. The other sensor(s) 1240 may include an accelerometer, a gyroscope, a light sensor, a magnetometer or a compass, a thermometer and/or the like. The processor 1250 is coupled to the image sensor 1220, the transmitter 1274, the receiver 1272 and the depth sensor 1230. The processor 1250 is configured to enable the depth sensor 1230 and convert the depth information into a depth map. The processor may further be configured to disable the depth sensor.

The mobile device 100 may also include a memory 1260 and a transceiver 1270 coupled to the bus 1210 or processor 1250. The memory 1260 may include code to perform embodiments described herein. The transceiver 1270 includes a receiver 1272 and a transmitter 1274 and allows the mobile device 100 to communicate with the server 200. The receiver 1272 receives an indication indicating the object was not found in the image or the object was found but with insufficient certainty. The transmitter 1274 sends at least some of the image to a server 200 to search for an object within the image. At least some of the image may include a partial image or a complete image. The transmitter 1274 may further send at least some of the depth map to the server 200. The transmitter 1274 may send both a newer image and at least some of the depth map to the server 200. Sometimes the processor 1250 is configured to parse the depth map into a partial depth map based at least in part on the depth map. Sometimes the processor 1250 is configured to exclude portions of the image based on private information to form the partial image.

In FIG. 13, a server 200 includes a processor 1320, memory 1310 and a transceiver 1330. The memory 1310 may include code to perform embodiments described herein. The transceiver 1330 allows the server 200 to communicate with the mobile device 100.

A partial image, as used herein, represents a portion or portions of the image for example within the certain range or not containing private information. Such private information may include one or more of a human face, a human head, a human silhouette, text and a license plate. The partial image may include a buffer area around the portion or portions of the partial image. The partial image may be a rectangular, an oval or a free-formed image.

A partial depth map (D') corresponds to the partial image. That is, the area covered (or not covered) by the partial image is covered (or not covered) by the partial depth map (D'). In this matter, a partial image is paired to a corresponding partial depth map (D'). Alternatively, an image is parsed to a partial image but an entire depth map (D) is communicated. In some embodiments, a partial image and a partial depth map (D') exclude private information regardless of certain ranges. Private information (or identifying information) may be used to identify an individual. In other embodiments, a partial image and a partial depth map (D') exclude private information, for example, if within a certain range.

Figure 14:
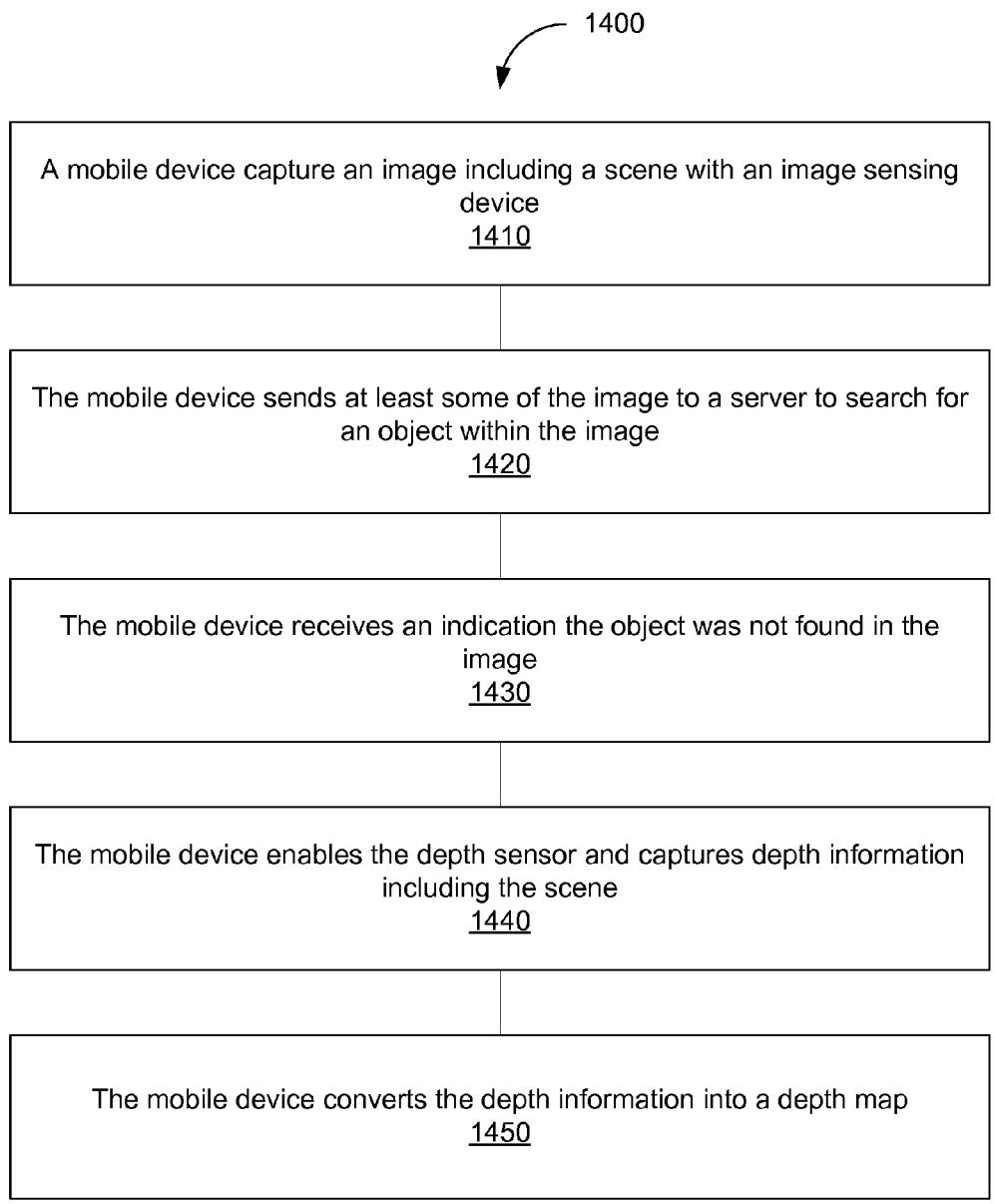
FIG. 14 illustrates a method in a mobile device for triggering a depth sensor, in accordance with some embodiments of the present invention.

FIG. 14 illustrates a method 1400 in a mobile device 100 for triggering a depth sensor, in accordance with some embodiments of the present invention. At 1410, a mobile device 100 captures an image with an image sensing device or other image sensor. The image sensing device acts as a means for capturing an image. The image sensing device may act as a means for capturing a new, second or refreshed image.

At 1420, the mobile device 100 sends at least some of the image to a server 200 to search for an object within the image. The transmitter acts as a means for sending at least some of the image to a server 200 to search for an object within the image. The transmitter may also act as a means for sending at least some of the depth map to the server 200, a means for sending the partial depth map to the server 200 and/or a means for sending the refreshed image and at least some of the depth map to the server 200. The transmitter, which sends at least some of the image, may excluded portions of the image based on private information. Such private information may include at least one of a human face, a human head, a human silhouette, text or a license plate.

At 1430, the mobile device 100 receives an indication indicating the object was not found in the image. The receiver acts as a means for receiving an indication indicating the object was not found in the image.

At 1440, the mobile device 100 enables the depth sensor and captures depth information with the depth sensor. The mobile device 100 optionally disables the depth sensor. The processor acts as a means for enabling the depth sensor, capturing depth information and disabling the depth sensor. Furthermore, the processor may act as a means for parsing the depth map into a partial depth map based at least in part on the depth map.

At 1450, the mobile device 100 converts the depth information into a depth map. The processor also acts as a means for converting the depth information into a depth map. The mobile device 100 may further send at least some of the depth map to the server 200. The mobile device 100 may parse the depth map into a partial depth map based at least in part on the depth map, and then send the partial depth map to the server 200. Sending at least some of the depth map to the server 200 may include capturing a newer image and sending the new image and at least some of the depth map to the server 200.

A method in a server 200 for triggering a depth sensor in a mobile device 100 includes the following. The server 200 receives at least some of an image from the mobile device 100 captured by an image sensing device within the mobile device 100. The server 200 searches for an object within the image. The server 200 sends an indication, indicating the object was not found in the image, for the mobile device 100 to enable the depth sensor and capture depth information.

The method may further include the server 200 receiving at least some of the depth map from the mobile device 100, wherein the depth map is converted from the depth information from the depth sensor. In some embodiment, at least some of the depth map is a partial depth map parse by the mobile device 100 to form the partial depth map. In some embodiment, the server 200 receives at least some of the depth map from the mobile device 100 comprises receiving a newer image and at least some of the depth map to the server 200, wherein the refreshed image is captured by the mobile device 100. The method may further include the server 200 receiving at least some of the image comprises receiving a partial image that excludes portions of the image based on private information.

Embodiments include a server 200 for triggering a depth sensor in a mobile device 100 including: (1) a receiver to receive at least some of an image from the mobile device 100 captured by an image sensing device within the mobile device 100; (2) a transmitter to send an indication, indicating either an object was not found in the image or the object was found but with insufficient certainty, for the mobile device 100 to enable the depth sensor and capture depth information; and (3) a processor coupled to the receiver and the transmitter, wherein the processor is configured to search at least some of the image for an object within the image.

Embodiments include a server 200 for triggering a depth sensor in a mobile device 100 including: (1) means for receiving at least some of an image from the mobile device 100 captured by an image sensing device within the mobile device 100; (2) means for searching at least some of the image for an object within the image; and (3) means for sending an indication, indicating either the object was not found in the image or the object was found but with insufficient certainty, for the mobile device 100 to enable the depth sensor and capture depth information.

Embodiments include a non-transient computer-readable storage medium, for a server 200 for triggering a depth sensor in a mobile device 100, including program code stored thereon, comprising program code to perform a method above.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. For example, a non-transient computer-readable storage medium, for a mobile device 100 for triggering a depth sensor, may include program code stored thereon to perform the methods described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for triggering a depth sensor, the method comprising:

capturing an image with an image sensing device;

sending at least some of the image to a server to search for an object within the image;
receiving an indication indicating the object was not found in the image with sufficient certainty;
enabling the depth sensor based on the indication and capturing depth information;
converting the depth information into a depth map; and
sending at least some of the depth map to the server.

2. The method of claim 1, further comprising disabling the depth sensor.

3. The method of claim 1, wherein sending the at least some of the depth map to the server comprises:
parsing the depth map into a partial depth map based at least in part on the depth map; and
sending the partial depth map to the server.

4. The method of claim 1, wherein sending the at least some of the depth map to the server comprises:
capturing a newer image; and
sending the newer image and the at least some of some of the depth map to the server.

5. The method of claim 1, wherein the depth sensor comprises an infrared depth sensor.

6. A mobile device for triggering a depth sensor, the mobile device comprising:
an image sensing device to capture an image;
a transmitter to send at least some of the image to a server to search for an object within the image;
a receiver to receive an indication indicating the object was not found with sufficient certainty;
the depth sensor to capture depth information; and
a processor coupled to the image sensing device, the transmitter, the receiver and the depth sensor, wherein the processor is configured to:
enable the depth sensor based on the indication;
convert the depth information into a depth map; and send at least some of the depth map to the server.

7. The mobile device of claim 6, wherein the processor is further configured to disable the depth sensor.

8. The mobile device of claim 6, wherein the processor is further configured to:
parse the depth map into a partial depth map based at least in part on the depth map; and
wherein the transmitter is further to send the partial depth map to the server.

9. The mobile device of claim 6, wherein the image sensing device is further configured to:
capture a newer image; and
wherein the transmitter is further to send the newer image and the at least some of some of the depth map to the server.

10. The mobile device of claim 6, wherein the depth sensor comprises an infrared depth sensor.

11. A mobile device for triggering a depth sensor, the mobile device comprising:
means for capturing an image with an image sensing device;
means for sending at least some of the image to a server to search for an object within the image;
means for receiving an indication indicating the object was not found in the image with sufficient certainty;
means for enabling the depth sensor based on the indication and capturing depth information;
means for converting the depth information into a depth map; and
means for sending at least some of the depth map to the server.

12. The mobile device of claim 11, further comprising means for disabling the depth sensor.

13. The mobile device of claim 11, wherein the means for sending the at least some of the depth map to the server comprises:
means for parsing the depth map into a partial depth map based at least in part on the depth map; and
means for sending the partial depth map to the server.

14. The mobile device of claim 11, wherein means for sending the at least some of the depth map to the server comprises:
means for capturing a newer image; and
means for sending the newer image and the at least some of some of the depth map to the server.

15. The mobile device of claim 11, wherein the depth sensor comprises an infrared depth sensor.

16. A non-transitory computer-readable storage medium, for a mobile device for triggering a depth sensor, including program code stored thereon, comprising program code for:
capturing an image with an image sensing device;
sending at least some of the image to a server to search for an object within the image;
receiving an indication indicating the object was not found in the image with sufficient certainty;
enabling the depth sensor based on the indication and capturing depth information;
converting the depth information into a depth map; and
sending at least some of the depth map to the server.

17. The non-transitory computer-readable storage medium of claim 16, wherein the program code further comprises program code for disabling the depth sensor.

18. The non-transitory computer-readable storage medium of claim 16, wherein the program code for sending the at least some of the depth map to the server comprises program code for:
parsing the depth map into a partial depth map based at least in part on the depth map; and
sending the partial depth map to the server.

19. The non-transitory computer-readable storage medium of claim 16, wherein the program code for sending the at least some of the depth map to the server comprises:
capturing a newer image; and
sending the newer image and the at least some of some of the depth map to the server.

20. The non-transitory computer-readable storage medium of claim 16, wherein the depth sensor comprises an infrared depth sensor.

* * * * *